(12) United States Patent
Schunk

(10) Patent No.: US 12,332,047 B2
(45) Date of Patent: Jun. 17, 2025

(54) NO EMISSION TANK GAUGE

(71) Applicant: Jeff Ray Schunk, Mason, MI (US)

(72) Inventor: Jeff Ray Schunk, Mason, MI (US)

( * ) Notice: Subject to any disclaimer, the term of this patent is extended or adjusted under 35 U.S.C. 154(b) by 356 days.

(21) Appl. No.: 18/162,418

(22) Filed: Jan. 31, 2023

(65) Prior Publication Data

US 2023/0243631 A1 Aug. 3, 2023

Related U.S. Application Data

(60) Provisional application No. 63/305,408, filed on Feb. 1, 2022.

(51) Int. Cl.
| | | |
|---|---|---|
| *G01B 3/02* | (2020.01) | |
| *F17C 13/04* | (2006.01) | |
| *G01D 11/02* | (2006.01) | |
| *G01F 23/04* | (2006.01) | |
| *G01F 23/34* | (2006.01) | |

(52) U.S. Cl.
CPC ............... *G01B 3/02* (2013.01); *F17C 13/04* (2013.01); *G01D 11/02* (2013.01); *G01F 23/045* (2013.01); *G01F 23/34* (2013.01); *F17C 2260/04* (2013.01); *F17C 2270/0134* (2013.01)

(58) Field of Classification Search
CPC ......... G01B 3/02; G01F 23/045; G01F 23/34; F17C 13/04; F17C 2260/04; F17C 2270/0134
See application file for complete search history.

(56) References Cited

U.S. PATENT DOCUMENTS

| | | | | |
|---|---|---|---|---|
| 2,009,117 A | * | 7/1935 | Meley ................. | G01F 23/0023 33/703 |
| 2,200,630 A | * | 5/1940 | McCabe ............. | G01F 23/0023 33/717 |
| 2,265,736 A | * | 12/1941 | Larson ................ | G01F 23/0023 33/715 |
| 2,637,111 A | * | 5/1953 | McDuff ............. | G01F 23/0023 33/720 |
| 2,869,239 A | * | 1/1959 | Jurs ..................... | G01F 23/0023 33/715 |
| 2,904,998 A | * | 9/1959 | Jurs ......................... | G01F 23/42 73/321 |

(Continued)

FOREIGN PATENT DOCUMENTS

WO WO-9303339 A1 * 2/1993 ......... G01F 23/0023

*Primary Examiner* — John Fitzgerald
(74) *Attorney, Agent, or Firm* — Young Basile Hanlon & MacFarlane, P.C.

(57) ABSTRACT

A no emission tank gauge has a housing having a valve connection extending from a bottom side of the housing, a gauge line within the housing, the gauge line having a plumb bob attached at a free end, a pulley attached within the housing and supporting the gauge line, the pulley configured to allow extension and retraction of the gauge line, and an actuator connected to the pulley and extending exterior to the housing and configured to actuate the extension and retraction of the gauge line via rotation of the pulley. The housing has a window in a wall of the housing facing a marked side of the gauge line. The valve connection has an opening sized to allow for passage of the plumb bob and the gauge line. The housing is sealed when the valve connection is connected to a valve to prevent escape of fluid.

8 Claims, 10 Drawing Sheets

(56) References Cited

U.S. PATENT DOCUMENTS

| | | | | |
|---|---|---|---|---|
| 3,500,546 A | * | 3/1970 | Pilcher | G01F 23/0023 |
| | | | | 73/321 |
| 3,838,518 A | * | 10/1974 | Hendrickson | G01F 23/0023 |
| | | | | 324/171 |
| 4,126,040 A | * | 11/1978 | Varacins | G01F 23/0023 |
| | | | | 73/293 |
| 4,255,859 A | * | 3/1981 | Klieman | G01F 23/0023 |
| | | | | 73/321 |
| 4,262,854 A | * | 4/1981 | Jett | B65H 75/38 |
| | | | | 242/584.1 |
| 4,875,295 A | * | 10/1989 | Fleckenstein | G01F 23/0023 |
| | | | | 33/720 |
| 5,144,836 A | * | 9/1992 | Webb | G01F 23/42 |
| | | | | 73/321 |
| 2017/0038239 A1 | * | 2/2017 | Kofford | G01F 23/04 |

* cited by examiner

NO EMISSION TANK GAUGE

CROSS-REFERENCE TO RELATED APPLICATION

This application claims priority to U.S. Provisional Patent Application Ser. No. 63/305,408, filed Feb. 1, 2022, the entire disclosure of which is hereby incorporated by reference.

TECHNICAL FIELD

This disclosure relates to a tank gauge and tank gauge system that allows for the gauging of tank levels while eliminating emissions to the atmosphere during gauging.

BACKGROUND

Storage tanks used to store industrial oils and other fluids (e.g., liquids and gasses) must be properly sealed to prevent leakage of vapors contained within the tanks. The fluids can contain volatile compounds such as hydro carbons or other contaminants which, if released, can harm the environment or persons handling the tanks. Companies can face government penalties if their storage tanks are not sufficiently vapor tight. For example, the EPA conducts leakage tests on industrial storage tanks using sophisticated infrared cameras and has the authority to levy steep penalties—even for minimal leakage that would be imperceptible without the use of such equipment.

To check the level of liquid in a tank, some tanks have electronic or external gauging. However, the majority do not have such gauging. The conventional method to gauge a tank level is to open a tank hatch and stick a gauge through the hatch until it reaches the tank bottom. The gauge is withdrawn and the level read off of the marked gauge stick. Every time a tank level is measured this way, vapor emissions are released unabated to the atmosphere through the open hatch. When gauging storage tanks, workers are exposed to high concentrations of gas vapors during the process.

SUMMARY

Disclosed herein are implementations of tank gauges and tank gauging systems configured to allow measurement of a storage tank's liquid level while severely reducing or eliminating emissions from the storage tank during gauging.

In one implementation, a no emission tank gauge system has a housing having a valve connection extending from a bottom side of the housing, a gauge line within the housing, the gauge line having a plumb bob attached at a free end, a pulley attached within the housing and supporting the gauge line, the pulley configured to allow extension and retraction of the gauge line, and an actuator connected to the pulley and extending exterior to the housing and configured to actuate the extension and retraction of the gauge line via rotation of the pulley. The housing has a window in a wall of the housing facing a marked side of the gauge line. The valve connection has an opening sized to allow for passage of the plumb bob and the gauge line. The housing is sealed when the valve connection is connected to a valve to prevent escape of fluid.

Another implementation disclosed herein is of a low emission tank gauge comprising a plug having a top surface, a slot formed in the top surface of the plug, and a gauge line extending through the slot and having a plumb bob attached at one end, wherein the slot is sized to just allow the gauge line to freely move through the slot. In some embodiments, the slot has a flat side wall and a toothed side wall.

An implementation of a storage tank gauge system comprises a storage tank, an isolation valve attached to a top of the storage tank and having a pipe nipple extending therefrom, a fitting on an end of the pipe nipple, and a low emission tank gauge. The low emission tank gauge comprises a plug having a top surface and an open bottom end, the plug configured to mate with the fitting, a slot formed in the top surface of the plug, and a gauge line having a plumb bob attached at one end, another end of the gauge line fed through the slot, wherein the slot is sized to just allow the gauge line to freely move through the slot.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The low emission tank gauge and system disclosed herein allow for fuel levels in storage tanks to be obtained while minimizing emissions from the storage tank to atmosphere.

Figure 1:
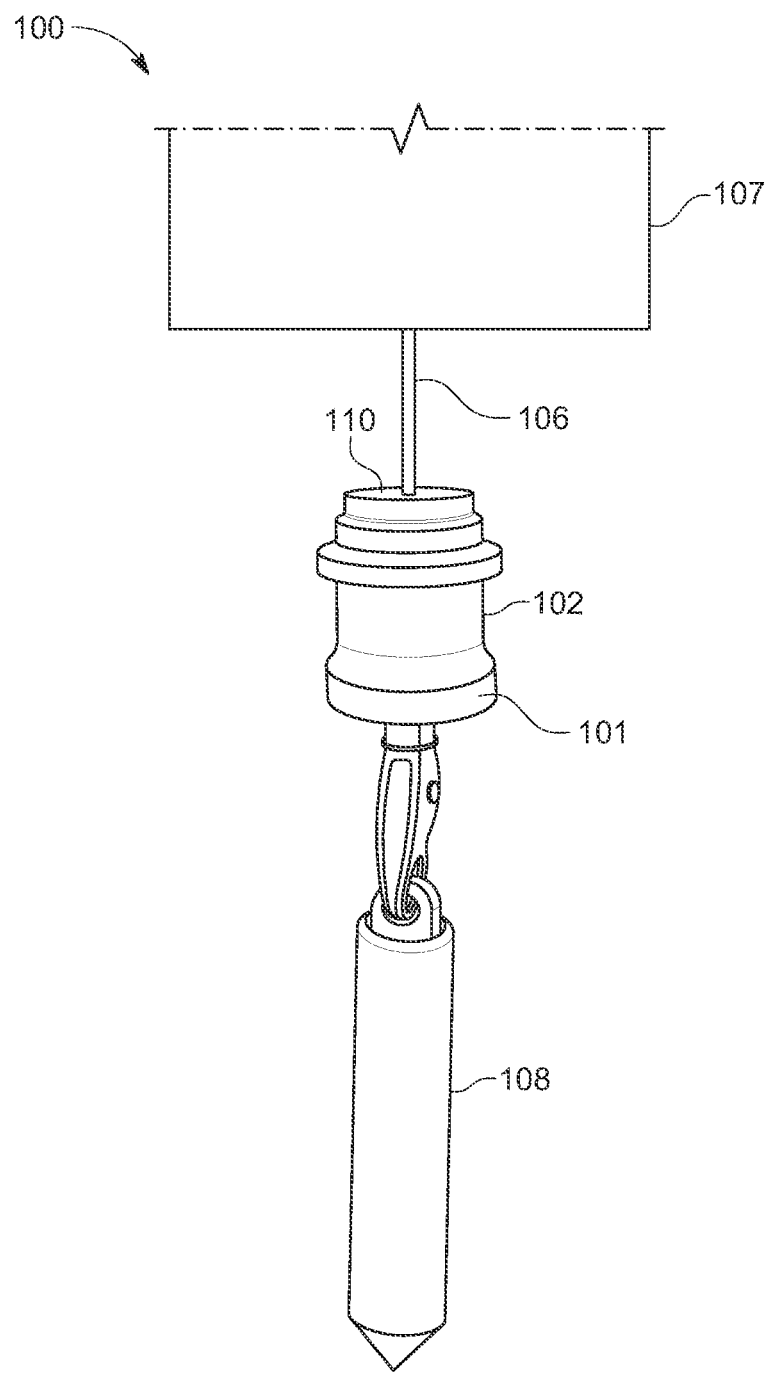
FIG. 1 is a schematic of a low emission tank gauge.
Figure 2:
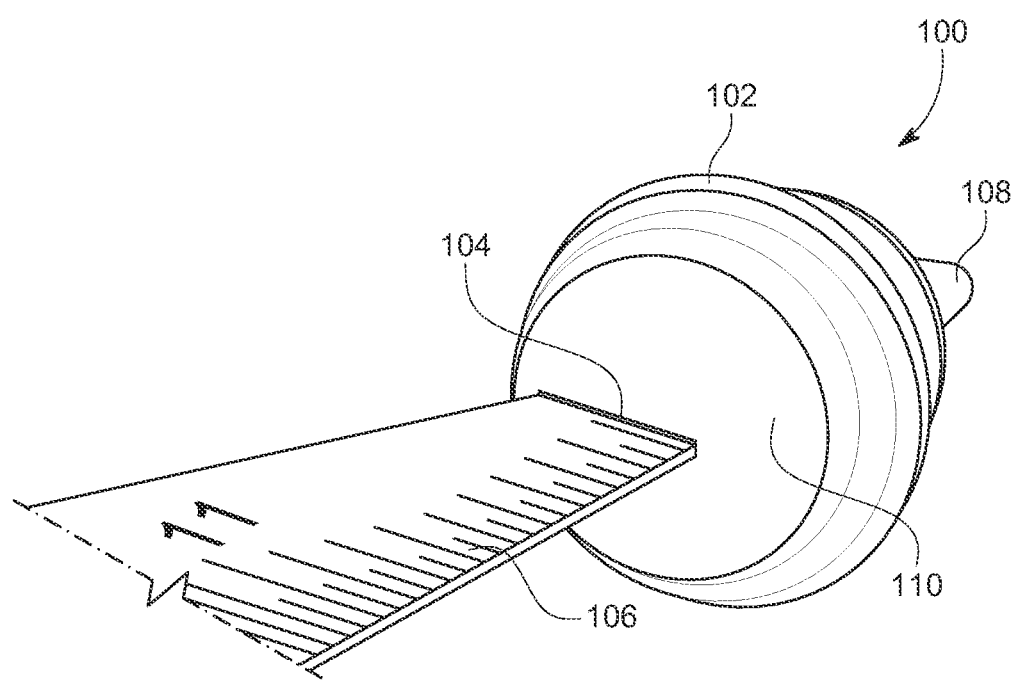
FIG. 2 is another view of the low emission tank gauge.

The low emission tank gauge 100 illustrated in FIGS. 1 and 2 comprises a plug 102 with a slot 104 through which a gauge line 106 or gauge tape passes through. The gauge line 106 is similar to a tape measure and can be housed in a housing 107 having a handle that can be used to unwind and rewind the gauge line 106. A plumb bob 108 is attached to the end of the gauge line 106 to provide weight to the gauge line 106 so that it pulls the gauge line 106 to the bottom of the tank. The gauge line 106 has measurements on at least one side. The slot 104 is formed in the top 110 of the plug 102 and is sized just slightly wider and deeper than the gauge line 106 so that the gauge line 106 freely moves within the slot 104 but very little vapor escapes through the slot 104. As a non-limiting example, the gauge line 106 thickness may be about 1/100 of an inch and the slot 104 will be slightly deeper than that, such as 1/5/100 of an inch. The width of the slot 104 may be about 2/100 of an inch wider than the gauge line 106.

Figure 3:
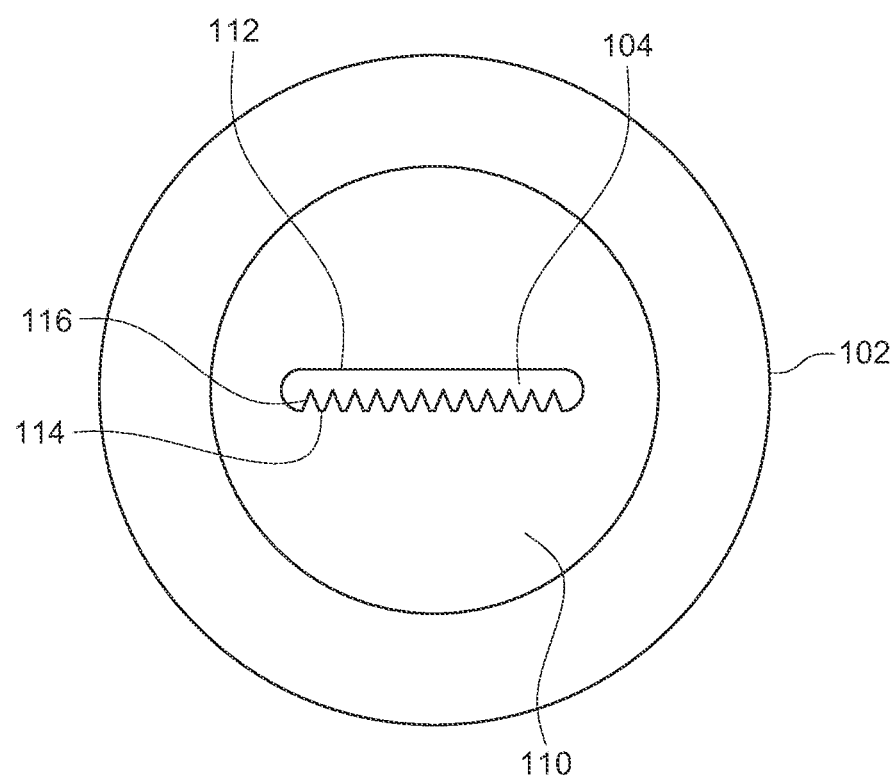
FIG. 3 is a plan view of the top of the plug illustrating an aspect of the slot.

In some embodiments, shown in FIG. 3, the slot 104 has a flat side wall 112 and a toothed side wall 114. The flat side wall 112 is configured to remove a majority of the liquid from the gauge line 106 as it is being pulled out of the tank. Accordingly, if measurements are on only one side of the gauge line 106, the measurements should be facing the toothed side wall 114 of the slot 104. The toothed side wall 114 is jagged, or has teeth 116 or a similar configuration that are configured to contact the gauge line 106 when it is being pulled through the slot 104, removing a portion of the liquid but leaving liquid where the teeth 116 do not contact the gauge line 106 so that the level can be read. This allows for the least liquid and vapor being removed from the tank during the measurement process.

Figure 4:
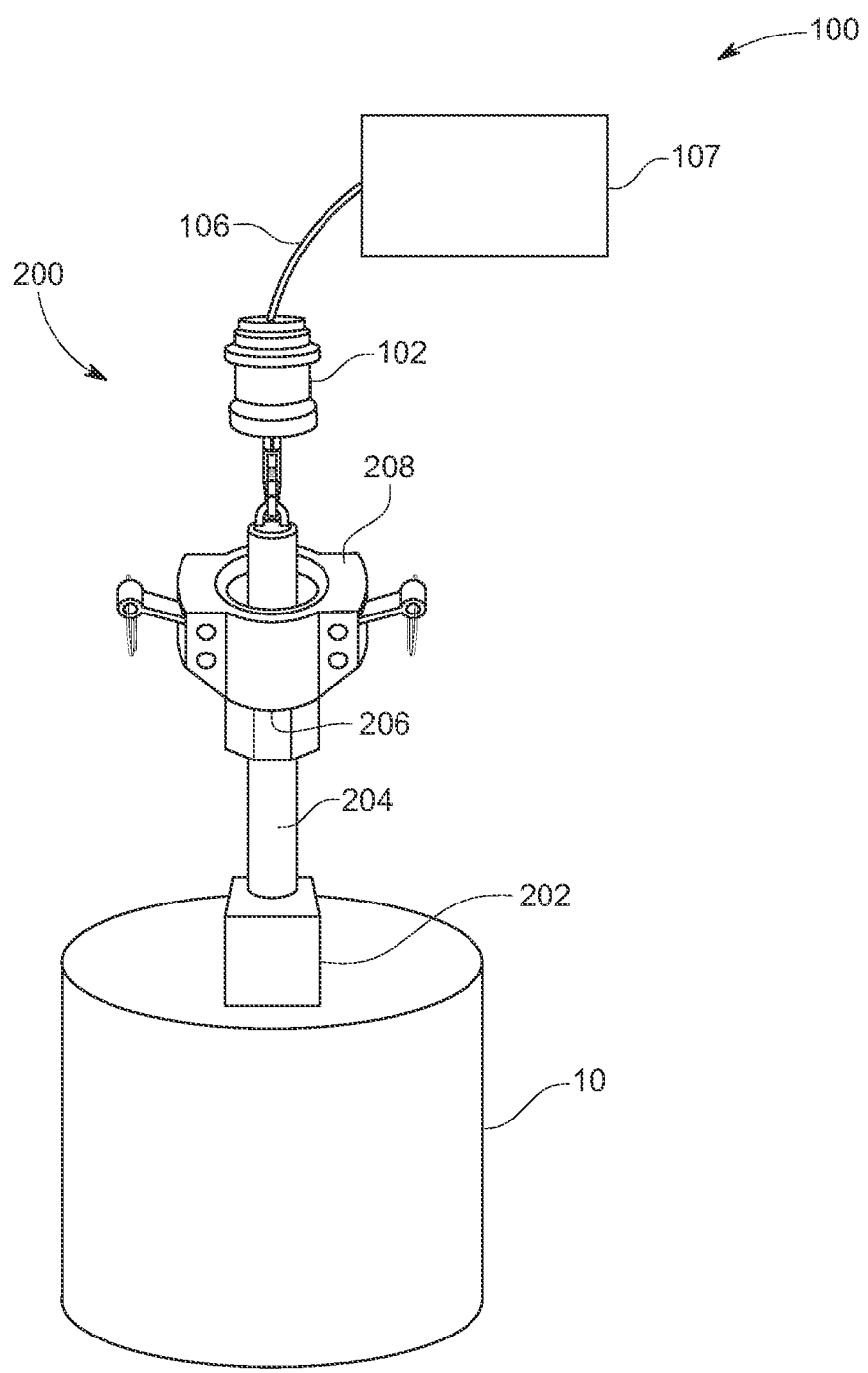
FIG. 4 is a schematic of a low emission tank gauge system.

The low emission tank gauge system 200 includes the low emission tank gauge 100 as well as an isolation valve 202 on the roof of the storage tank 10. See FIG. 4. The isolation valve 202 is connected to the tank roof. An existing isolation valve can be used, or a new isolation valve can be added to the top of the storage tank 10. From the isolation valve 202 extends a pipe nipple 204. The pipe nipple 204 can be of any length so long as it is long enough to accommodate the plumb bob 108. As a non-limiting example, a pipe nipple 204 of at least 10-12" in length or longer can be used. The isolation valve 202 and pipe nipple 204 should be of such a diameter that plumb bob 108 can pass through. As a non-limiting example, a 4" valve and pipe nipple can be used.

On the end 206 of the pipe nipple 204 is a fitting 208. The fitting 208 is an opposing fitting of an open bottom end 101 of the plug 102 (male/female). For example, as illustrated in the figures, the fitting 208 can be a cam lock fitting and the plug 102 can be a camlock plug that can be received in the cam lock fitting and tightened into place. Other non-limiting options include a threaded steel plug, plastic plug or even rubber. In this application it is any plug or seal that secures to a pipe thread off a valve on the top of the tank.

Figure 5:
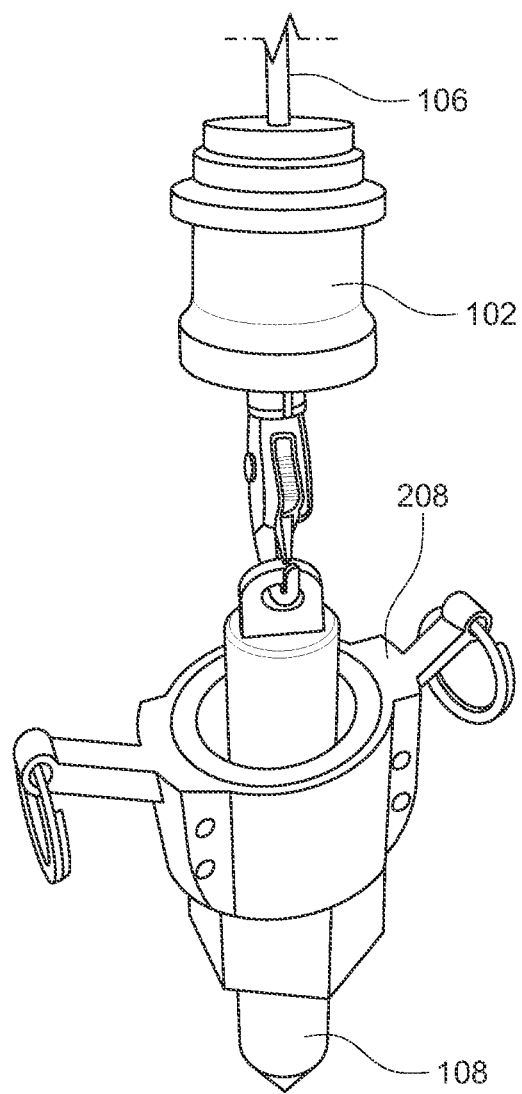
FIG. 5 is an illustration of the plumb bob being fed through the pipe nipple fitting.

When the storage tank 10 is not being gauged, the isolation valve 202 is closed to prevent escape of fluid. When the tank level is going to be measured, the plumb bob 108 is fed through the fitting 208 as illustrated in FIG. 5 and the plug 102 is secured with in the fitting 208. In FIG. 5, the fitting 208 is shown removed from the pipe nipple to better illustrate how the plumb bob 108 and gauge line 106 is fed through the fitting 208, pipe nipple 204 and into the storage tank 10. The isolation valve 202 is then opened and the gauge line 106 is fed through the slot 104 in the plug 102 until the plumb bob 108 is resting on the bottom of the tank. The gauge line 106 is then reeled back up through the slot 104, the operator looking for the liquid level. When the liquid level is seen, the measurement is taken. The remainder of the gauge line 106 is brought up until the plumb bob 108 is above the isolation valve 202. The isolation valve 202 is closed. The low emission gauge line 106 can be left in place or can be removed by unsecuring the plug 102 from the fitting 208. This gauging is performed with very minimal emissions leakage. The plug reduces emissions and exposure to people preforming gauging duties. The use of the slot also works as a wiper to remove excessive amounts of liquid from the gauge line as it is being pulled from the tank.

Figure 6:
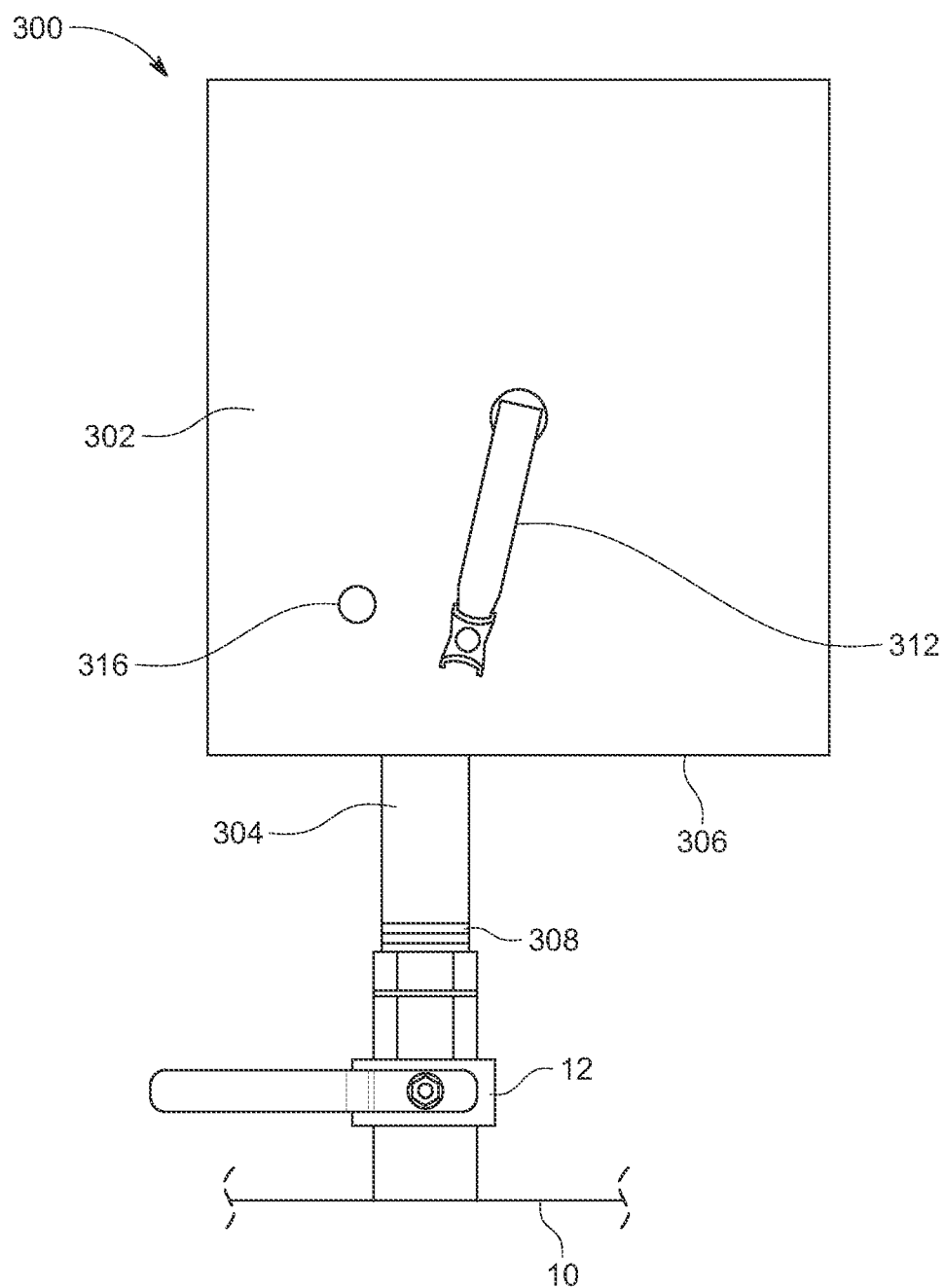
FIG. 6 is a schematic of a no emission tank gauge system.
Figure 7:
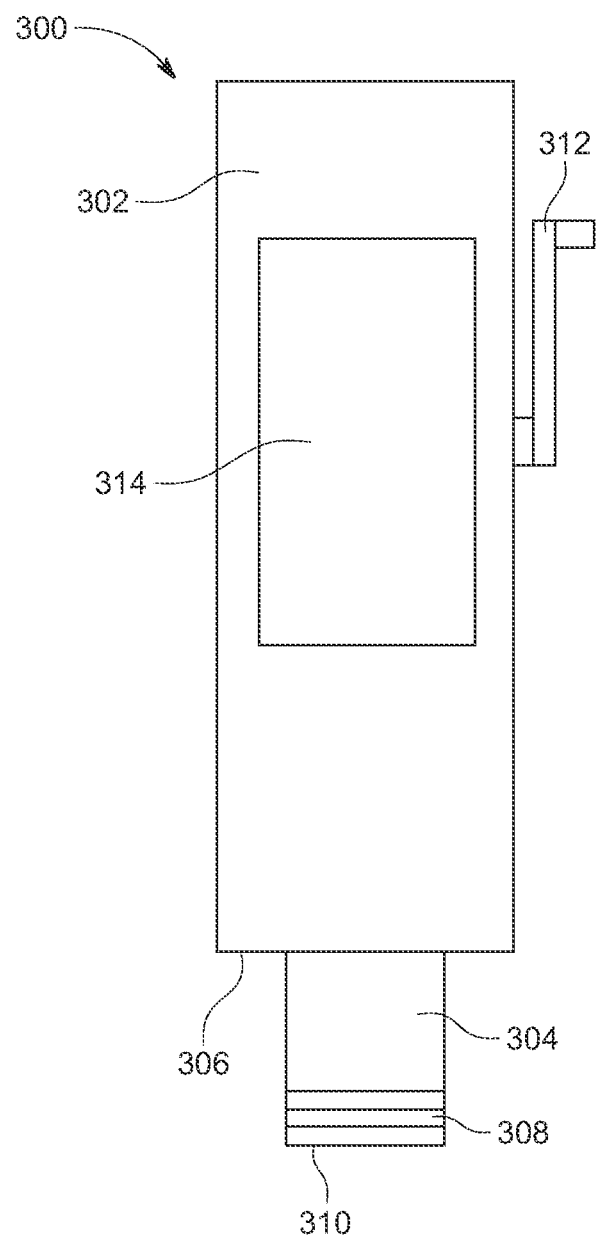
FIG. 7 is a view of the no emission tank gauge system of FIG. 6 showing the window.

Implementations of a no emission tank gauge system are described with respect to FIGS. 6-11. As shown in FIGS. 6 and 7, a no emission tank gauge system 300 has a housing 302 having a valve connection 304 extending from a bottom side 306 of the housing 302. The valve connection 304 can be a pipe nipple as illustrated, with threads 308 on a distal end 310 of the pipe nipple. Other valve connections known to those skilled in the art are contemplated so long as the valve connection sealingly connects to the valve. The housing 302 also has an actuator 312, the function of which is described below. The housing 302 also has a window 314 to see within the housing 302.

In FIG. 6, the valve connection 304 is illustrated connected to a valve 12 on the top of the storage tank 10. The no emission tank gauge system 300 is attached to the valve 12 when the valve is closed. The no emission tank gauge system 300 can be left in place, such as dedicated to the particular storage tank 10, with the valve 12 opened when the tank level is to be measured and closed after measurement is completed. Alternatively, the no emission tank gauge system 300 can be portable to use on any number of tanks, with the no emission tank gauge system 300 attached to the valve 12 when the valve is closed, the valve then opened to measure the storage tank level and re-closed after measurement is completed. The no emission tank gauge system 300 is then removed from the valve 12 for use with another storage tank.

Figure 8:
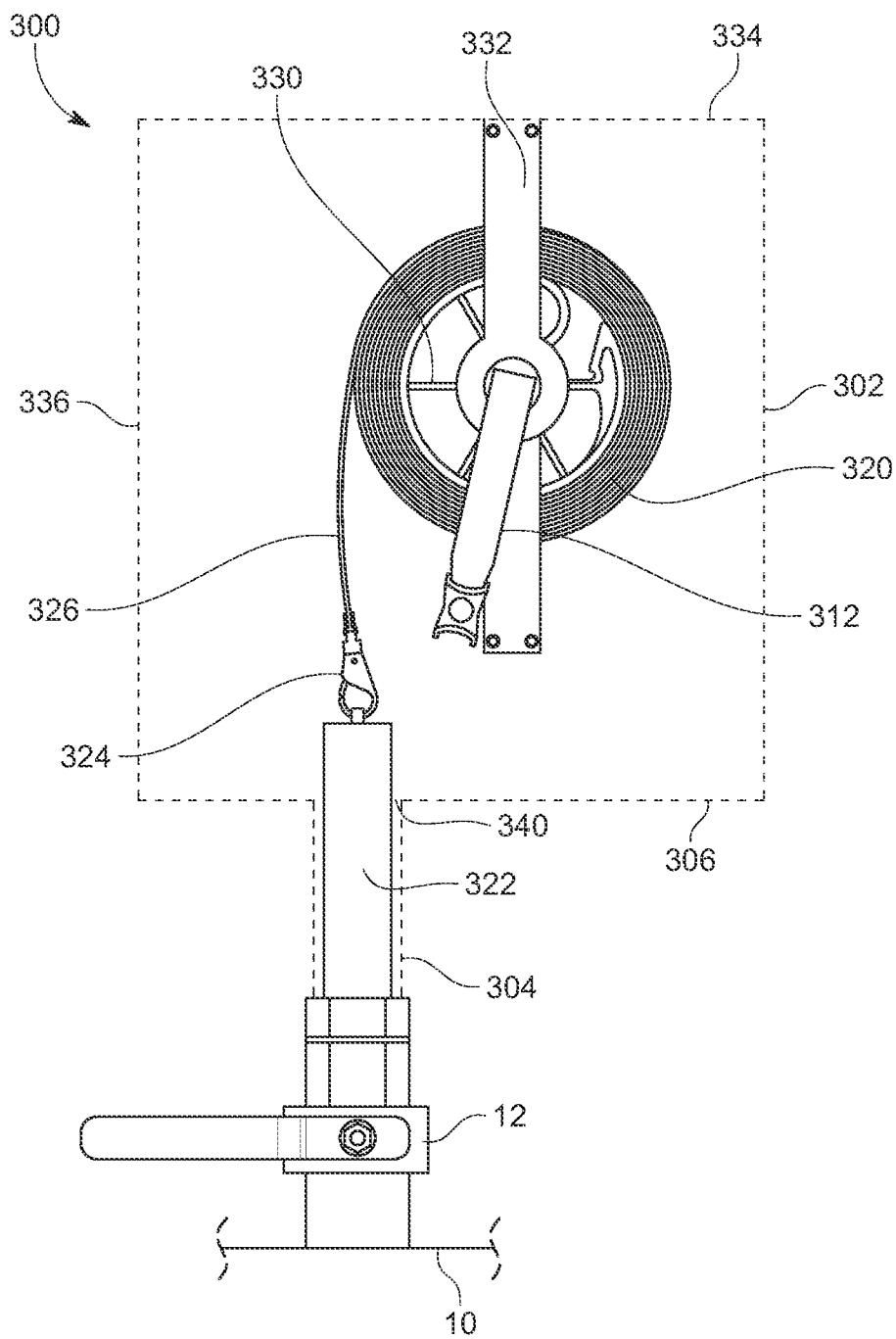
FIG. 8 is a schematic of the no emission tank gauge system with the housing and valve connection in broken line to show the internals of the housing.
Figure 9:
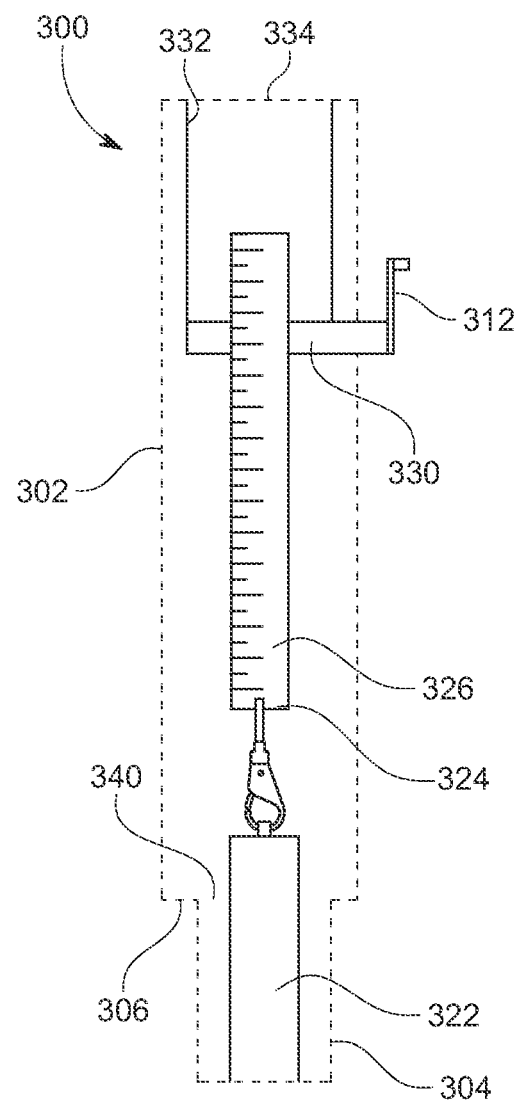
FIG. 9 is a view of the no emission tank gauge system of FIG. 8 from a side with the window.

FIGS. 8 and 9 illustrate the no emission tank gauge system 300 with the housing 302 and valve connection 304 in broken line to show the internal mechanisms within the housing 302. Within the housing 302 is a gauge line 320, the gauge line 320 having a plumb bob 322 attached at a free end 324 of the gauge line 320. The plumb bob is illustrated in FIGS. 8 and 9 as either extending into the valve 12 or being retracted from the valve 12. The plumb bob 322 can be the same as plumb bob 108 shown in FIG. 1. The gauge line 320 is a line or tape having at least one marked side 326 with a means for reading a measurement value. A pulley 330 is attached within the housing 302 to support the gauge line 320. A housing attachment portion 332 of the pulley 330 is illustrated attached to a ceiling wall 334 of the housing 302 for illustration, but can be attached to a different wall so long as the plumb bob 322 and free end 324 of the gauge line 320 are aligned above the valve connection 304. The pulley 330 is configured to allow extension and retraction of the gauge line 320. To ensure that the gauge line 320 is aligned with the opening 340 of the valve connection 304, the plumb bob 322 can be positioned with its tip inside the valve connection 304 to an extent so that it does not extend below the distal end 310 of the valve connection 304. The plumb bob 322 is weighted.

The actuator 312 is connected to the pulley 330 and extends exterior to the housing 302 as illustrated in FIGS. 6 and 7. The actuator 312 is configured to actuate the extension and retraction of the gauge line 320 via rotation of the pulley 330. The actuator 312 can be a rotatable handle configured to manually rotate the pulley. The actuator 312 may also include a release 316, that may be part of the actuator 312 or a separate actuator, configured to automatically retract the gauge line 320 rather than manually retracting the gauge line 320. The release 316 could be attached to a spring within the housing 302. When the gauge line 320 is extended, the spring extends, and when the release 316 is pressed, the spring retracts to its original position, retracting the gauge line 320.

The window 314 in the housing 302 is in a wall 336 of the housing 302 that faces the marked side 326 of the gauge line 320. The valve connection 304 has an opening 340 sized to allow for passage of the plumb bob 322 and the gauge line 320. The housing 302 is sealed when the valve connection 304 is connected to the valve 12, preventing escape of any emissions, such as vapors and gasses, that would release to atmosphere when the valve 12 is opened.

In use, the no emission tank gauge system 300 is attached to the valve 12 on the storage tank 10 via the valve connection 304. The valve 12 is opened. The gauge line 320 is extended by rotating the pulley 330 in a first direction with the actuator 312. The weighted plumb bob 322 will assist in directing the gauge line 320 through the valve connection 304 and opened valve 12 and into the storage tank 10. The gauge line 320 is extended until the plumb bob 322 contacts the bottom surface of the storage tank 10. At that time, the gauge line 320 can be manually retracted with the actuator 312 in a second direction, with the operator viewing the retracting gauge line 320 through the window 314 of the housing 302. When the operator sees the liquid line on the marked side 326 of the gauge line 320, the tank level is read and recorded. The remaining of the gauge line 320 can be fully retracted using the actuator 312 manually or using the release 316. The valve 12 is closed once the plumb bob 322 is above the valve 12. The no emission tank gauge system 300 can be left in place for the next tank level reading or can be removed via the valve connection 304 to be used elsewhere.

Figure 10:
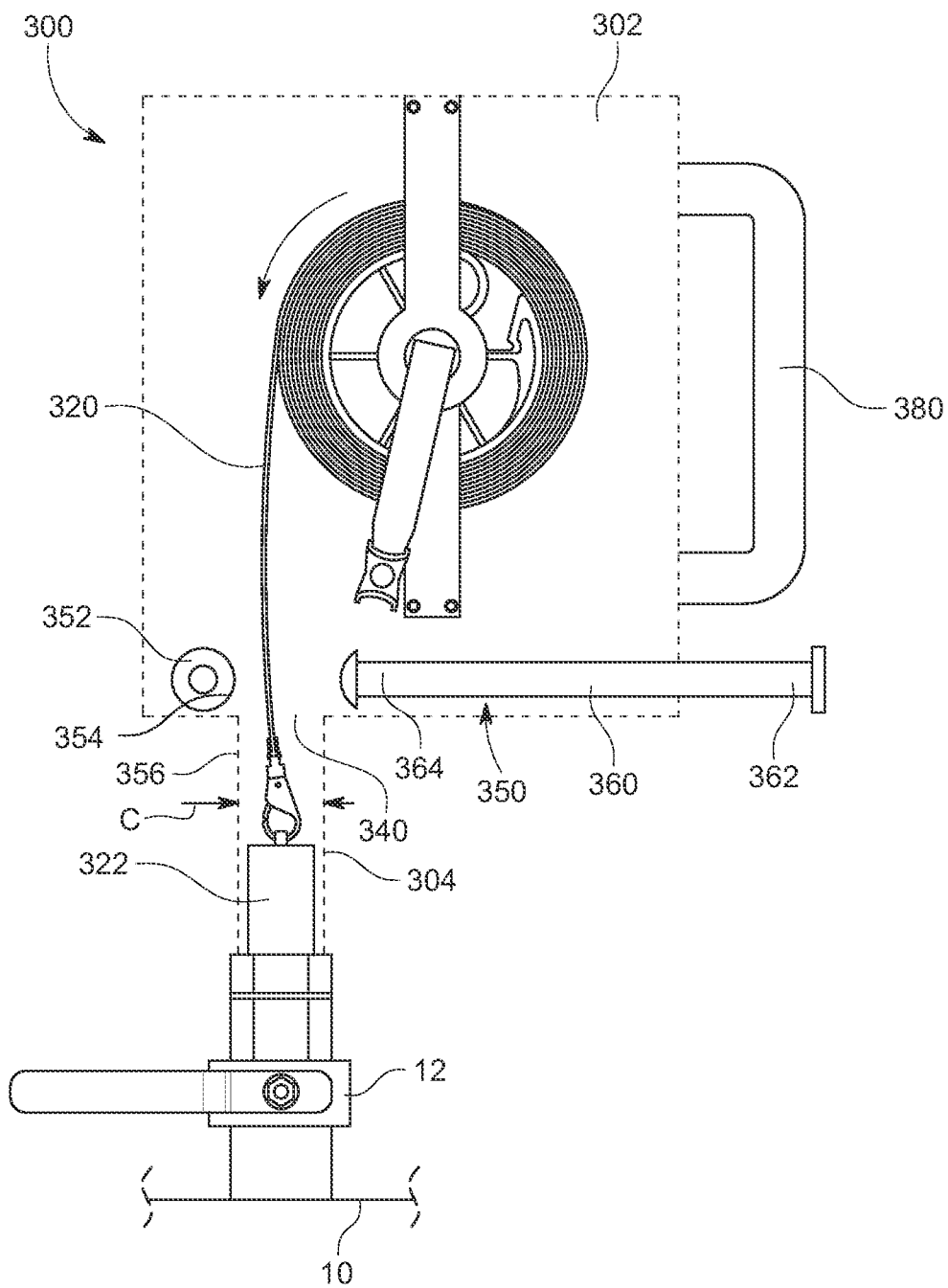
FIG. 10 is a schematic of the no emission tank gauge system with the housing and valve connection in broken line to show the internals of the housing, the internals including an optional gauge line liquid remover in an at-rest, open position.
Figure 11:
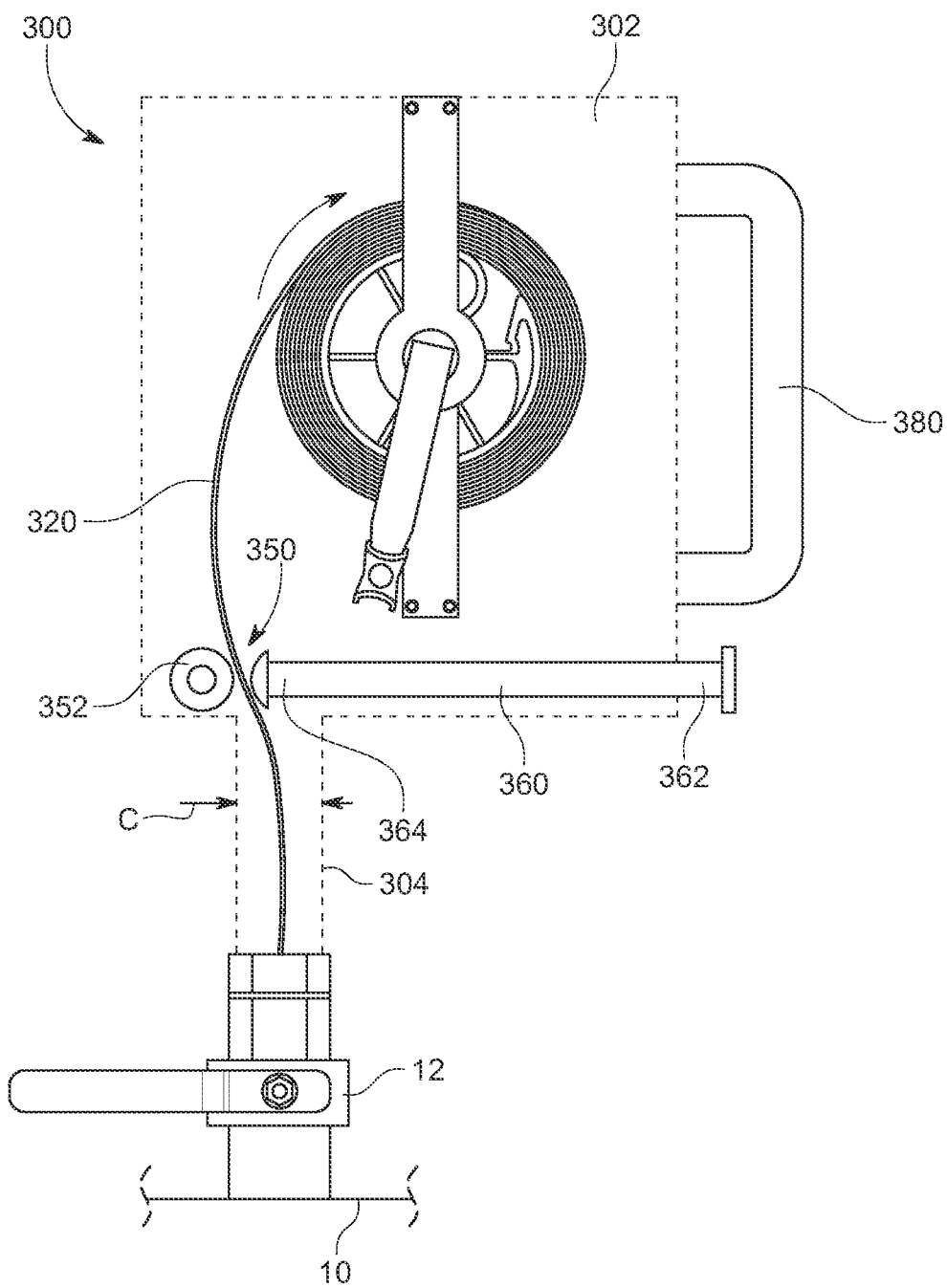
FIG. 11 is a schematic of the no emission tank gauge system with the housing and valve connection in broken line to show the internals of the housing, the internals including the optional gauge line liquid remover in an activated position.

FIGS. 10 and 11 illustrate an optional aspect of the no emission tank gauge system 300, the system 300 further including a gauge line liquid remover 350. The gauge line liquid remover 350 is configured to have an at-rest, open position to allow the plumb bob 322 and gauge line 320 to pass through the valve connection 304 without obstruction either during retraction or extension. The gauge line liquid remover 350 also has an activated position in which the gauge line liquid remover 350 contacts the gauge line 320 to remove liquid after tank level measurement, the removal occurring as the gauge line 320 is being retracted. So that the tank level can be read, the gauge line liquid remover 350 is not activated until the liquid level measurement is read through the window. After which, the gauge line 320 can be extended such that the liquid level line is in the valve connection 304. The gauge line liquid remover 350 can then be activated and the gauge line retracted fully. The gauge line liquid remover 350 cleans the gauge line, removing the liquid so that subsequent measurements are not negatively affected. Once the plumb bob 322 contacts the gauge line liquid remover 350, the gauge line liquid remover 350 can be deactivated into the at-rest, open position.

The gauge line liquid remover 350 has a cleaning member 352 attached within the housing 302 such that a surface 354 of the cleaning member 352 aligns with a first side 356 of the opening 340 of the valve connection 304. A plunger 360 is movably attached within the housing 302 and has a first end 362 positioned external to the housing 302 and a second end 364 within the housing 302. The plunger 360 has a first position shown in FIG. 10 in which the second end 364 is not within a circumference C of the opening 340 of the valve connection 304 and a second position, shown in FIG. 11, in which the second end 364 is within the circumference C of the opening 340 of the valve connection 304. The plunger 360 is configured to be manually moved between the first position and the second position via the first end 362. One or both of the cleaning member 352 and the second end 364 of the plunger 360 may be made of a sponge-like material to assist in frictionally contacting the gauge line 320 and removing the liquid. The cleaning member 352 may be a roller as illustrated, attached to the housing but configured to roll as the gauge line 320 moved past it, the roller removing the liquid on the marked side 326 of the gauge line 320. The cleaning member 352 can be other than a roller, such as a wiper blade of a flexible material. The second end 364 of the plunger 360 may be shaped in an arc to represent a roller or may be a wiper of a somewhat flexible material so that it can remove the liquid from the gauge line. The plunger 360 is provided by way of example. The plunger 360 may be more than one piece or extend from a different wall of the housing, so long as the plunger is configured to move the gauge line 320 so that it is contact with the cleaning member 352.

FIGS. 10 and 11 also illustrate another optional aspect of the no emission tank gauge system 300, the system 300 further including a fixed handle 380 attached to an external wall of the housing 302. For example, the fixed handle 380 can be attached to a wall as illustrated in the figures. Alternatively, the fixed handle 380 can be attached to the wall opposite the wall through which the actuator 312 extends, so that an operator can hold the fixed handle while turning the actuator 312 and looking through the window 314.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A no emission tank gauge system, comprising:
a housing having a valve connection extending from a bottom side of the housing;
a gauge line within the housing, the gauge line having a plumb bob attached at a free end; a gauge liquid remover;
a pulley attached within the housing and supporting the gauge line, the pulley configured to allow extension and retraction of the gauge line; and
an actuator connected to the pulley and extending exterior to the housing and configured to actuate the extension and retraction of the gauge line via rotation of the pulley, wherein:
the housing has a window in a wall of the housing facing a marked side of the gauge line;
the valve connection has an opening sized to allow for passage of the plumb bob and the gauge line; and
the housing is sealed when the valve connection is connected to a valve to prevent escape of fluid wherein the gauge line liquid remover comprises: a cleaning member attached within the housing such that a surface of the cleaning member aligns with a first side of an opening of the valve connection; and a plunger movably attached within the housing and having a first end positioned external to the housing and a second end within the housing, wherein: the plunger has a first position in which the second end is not within a circumference of the opening of the valve connection and a second position in which the second end is within the circumference of the opening of the valve connection, and the plunger is configured to be manually moved between the first position and the second position via the first end.

2. The no emission tank gauge system of claim 1, wherein the valve connection is a pipe nipple with threads at a distal end.

3. The no emission tank gauge system of claim 1, wherein one or both of the cleaning member and the second end of the plunger comprises a sponge-like material.

4. The no emission tank gauge system of claim 1, wherein the cleaning member is a roller.

5. The no emission tank gauge system of claim 1, wherein the cleaning member is a flexible blade.

6. The no emission tank gauge system of claim 1, wherein the housing further comprises a fixed handle attached to an external wall of the housing.

7. The no emission tank gauge system of claim 1, wherein the actuator is a rotatable handle configured to manually rotate the pulley.

8. The no emission tank gauge system of claim 7, wherein the actuator further comprises a release configured to automatically retract the gauge line.

* * * * *